United States Patent
Matan et al.

(10) Patent No.: US 9,260,859 B2
(45) Date of Patent: Feb. 16, 2016

(54) WALL STRUCTURE WITH NOISE DAMPING INSULATION PROPERTIES AND GAS TURBINE WITH SUCH A WALL STRUCTURE

(75) Inventors: Mladen Matan, Karlovac (HR); Marc Rauch, Regensdorf (CH); Eduard Brühwiler, Turgi (CH); Antun Svilicic, Duga Resa (HR)

(73) Assignee: ALSTOM TECHNOLOGY LTD, Baden (CH)

( * ) Notice: Subject to any disclaimer, the term of this patent is extended or adjusted under 35 U.S.C. 154(b) by 607 days.

(21) Appl. No.: 13/604,373

(22) Filed: Sep. 5, 2012

(65) Prior Publication Data
US 2013/0071231 A1 Mar. 21, 2013

(30) Foreign Application Priority Data
Sep. 12, 2011 (EP) .................................... 11180934

(51) Int. Cl.
| | |
|---|---|
| F02C 7/045 | (2006.01) |
| E04B 1/84 | (2006.01) |
| E04B 2/00 | (2006.01) |
| F02C 7/24 | (2006.01) |
| F04D 29/02 | (2006.01) |
| F04D 29/52 | (2006.01) |
| F04D 29/66 | (2006.01) |

(52) U.S. Cl.
CPC ... *E04B 1/84* (2013.01); *E04B 2/00* (2013.01); *F02C 7/045* (2013.01); *F02C 7/24* (2013.01); *F04D 29/023* (2013.01); *F04D 29/526* (2013.01); *F04D 29/664* (2013.01); *F05D 2260/96* (2013.01)

(58) Field of Classification Search
CPC .............. F02C 7/04; F02C 7/045; F02C 7/24; F01D 25/04; F04D 29/664
USPC ................................. 181/213–214, 222, 229
See application file for complete search history.

(56) References Cited

U.S. PATENT DOCUMENTS

| | | | | |
|---|---|---|---|---|
| 4,452,335 A | * | 6/1984 | Mathews et al. | 181/214 |
| 4,753,319 A | * | 6/1988 | Vinciguerra | 181/218 |
| 4,944,362 A | * | 7/1990 | Motsinger et al. | 181/213 |

(Continued)

FOREIGN PATENT DOCUMENTS

| | | |
|---|---|---|
| EP | 0819842 | 1/1998 |
| EP | 1657374 | 5/2006 |

(Continued)

OTHER PUBLICATIONS

NA 021-00-21-06 UA (Responsible Committee), DIN 1025, Nov. 1995, Germany.*

(Continued)

*Primary Examiner* — Christopher Verdier
(74) *Attorney, Agent, or Firm* — Buchanan Ingersoll & Rooney PC

(57) ABSTRACT

A wall structure is provided with noise damping insulation properties, for an air intake manifold of a gas turbine. The wall structure includes a first structure for mechanically supporting an outer sheet, which separates the spaces on both sides of the wall in an airtight manner, and further includes a second structure for establishing noise damping insulation between the spaces on both sides of the wall. The second structure is secured to the first structure. A gas turbine including the wall structure is also provided.

17 Claims, 4 Drawing Sheets

(56) References Cited

U.S. PATENT DOCUMENTS

| | | | |
|---|---|---|---|
| 5,594,216 A | 1/1997 | Yasukawa et al. | |
| 6,182,787 B1 | 2/2001 | Kraft et al. | |
| 6,439,340 B1 | 8/2002 | Shirvan | |
| 7,798,285 B2 * | 9/2010 | Chiou et al. | 181/213 |
| 7,832,524 B2 | 11/2010 | Mueller et al. | |
| 2003/0072648 A1 * | 4/2003 | Han et al. | 415/119 |
| 2004/0045765 A1 * | 3/2004 | Porte | 181/210 |
| 2008/0202848 A1 * | 8/2008 | Mueller et al. | 181/229 |
| 2011/0133025 A1 * | 6/2011 | Vauchel et al. | 244/1 N |

FOREIGN PATENT DOCUMENTS

| | | |
|---|---|---|
| EP | 2192289 | 6/2010 |
| FR | 2934641 | 2/2010 |
| FR | 2940360 | 6/2010 |
| RU | 2241843 C1 | 10/2014 |

OTHER PUBLICATIONS

Steel and Iron Standards Committee, Germany, DIN 1025-2, Nov. 1995, pp. 1-3.*
Office Action issued on May 15, 2014, by the Russian Patent Office in corresponding Russian Patent Application No. 2012138961, and an English Translation of the Office Action. (9 pages).
European Search Report, Jan. 26, 2012, 8 pp.
Decision of Grant issued Oct. 20, 2014 by the Russian Patent Office in corresponding Russian Patent Application No. 2012138961, and an English translation thereof (10 pages).

* cited by examiner

WALL STRUCTURE WITH NOISE DAMPING INSULATION PROPERTIES AND GAS TURBINE WITH SUCH A WALL STRUCTURE

RELATED APPLICATION

The present application hereby claims priority under 35 U.S.C. Section 119 to European Patent application number 11180934.9, filed Sep. 12, 2011, the entire contents of which are hereby incorporated by reference.

FIELD OF INVENTION

The present invention relates to the technology of gas turbines. It refers to a wall structure with noise damping insulation properties, especially for an air intake manifold of a gas turbine.

BACKGROUND

Gas turbines use ambient air as combustion air for the combustion of fuel to generate hot gas, which drives a turbine. A typical industrial gas turbine, which is used as a stationary turbine for the generation of electric power, is shown in FIG. 1. The exemplary gas turbine 10 of FIG. 1 is equipped with sequential combustion. It comprises a compressor 12 for compressing the combustion air, a first combustor 13, a first turbine 14, a second combustor 15 and a second turbine 16. The ambient air to be compressed by the compressor 12 enters the gas turbine through an air intake 11.

FIG. 1 shows the bare gas turbine 10. The ambient air, which is compressed by the compressor 12, usually has to be filtered and in some cases mixed with water by means of a fogging device, before being introduced into the compressor through the air duct, air intake manifold 17, and the air intake 11. In most cases, an air intake manifold 17, as shown in FIG. 2, is used to guide the air from the entrance of a gas turbine plant to the air intake 11 of gas turbine 10.

The air intake manifold 17 of FIG. 2 is made up of several walls 18, which enclose an inner space with an inlet opening 19 and an outlet opening 20, the outlet opening 20 being adapted to the air intake 11 of the gas turbine 10. The air intake manifold 17 has a wall structure 21, which serves several purposes:
- it must provide a sufficient mechanical stiffness, which is necessary for a box with outer dimensions of several meters;
- it must be airtight so that no unfiltered secondary air enters from outside; and
- it should have noise damping insulation properties so that the environment is protected against noise generated by the compressor and the air flowing through the air intake manifold.

The air intake manifold 17 of FIG. 2 has a wall structure 21 a part of which is shown in FIG. 3. A frame of L beams 22, which is reinforced with crossing ribs 23, supports from the outside an outer sheet 24, which separates the inner space (on the left of outer sheet 24 in FIG. 3) of the air intake manifold 17 from the outside (on the right of outer sheet 24 FIG. 3).

A noise damping insulation is provided on and assembled from the inner side of the outer sheet 24. Insulation ribs 26, made of stainless steel (X6CrNiTi18-10 or similar) are welded on the outer sheet 24 forming square frames (see also FIG. 2). Each frame is filled with a noise damping insulation material 25 made for example of melamine foam with a thickness of 45 mm. The noise damping insulation material 25 or melamine foam is covered with 3 mm thick perforated sheets 27 made of stainless steel. Fixation plates 28 are welded on the insulation ribs to keep the perforated sheets 27 in place. An example of an air intake manifold and wall structure is disclosed in document US 2008/0202848 A1.

This prior art wall structure design has some disadvantages:
- there are two support structures: (1) a main structure made of L beams of the dimension 150×150×15 mm reinforced with ribs 100×10 mm from outside, and (2) an insulation structure made of stainless steel ribs 45×4 mm for carrying melamine foam and perforated sheets;
- numerous small parts (e.g. fixation plates 28) are welded in the flow channel (inner space of air intake manifold);
- deformations of the insulation ribs and walls are possible during the welding process.

SUMMARY

The present disclosure is directed to a wall structure with noise damping insulation properties for an air intake manifold of a gas turbine. The wall structure includes a first structure that mechanically supports an outer sheet, which separates spaces on both sides of the wall in an airtight manner, and further includes a second structure that establishes noise damping insulation between the spaces on both sides of the wall. The second structure is secured to the first structure and the second structure is integrated in the first structure.

The present disclosure is also directed to a gas turbine, which includes the above wall structure.

BRIEF DESCRIPTION OF THE DRAWINGS

The present invention is now to be explained more closely by means of different embodiments and with reference to the attached drawings.

DETAILED DESCRIPTION OF THE PREFERRED EMBODIMENTS

Introduction to the Embodiments

Figure 1:
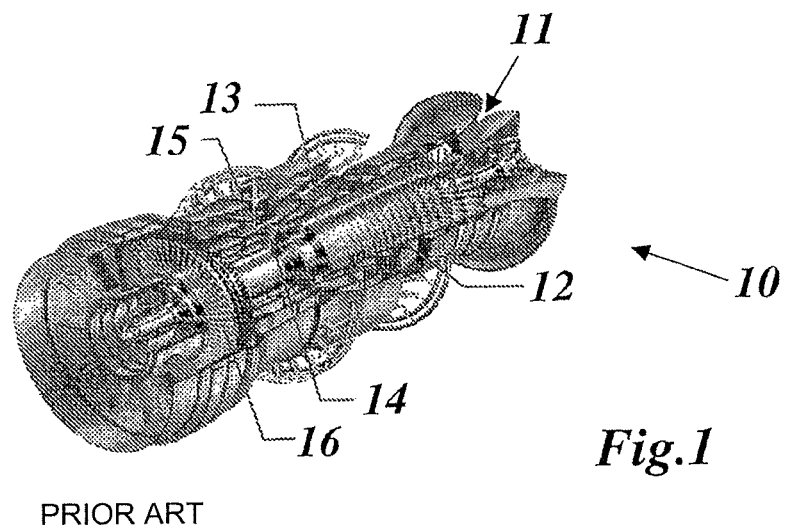
FIG. 1 shows a perspective view of a type GT26 stationary gas turbine with sequential combustion.
Figure 2:
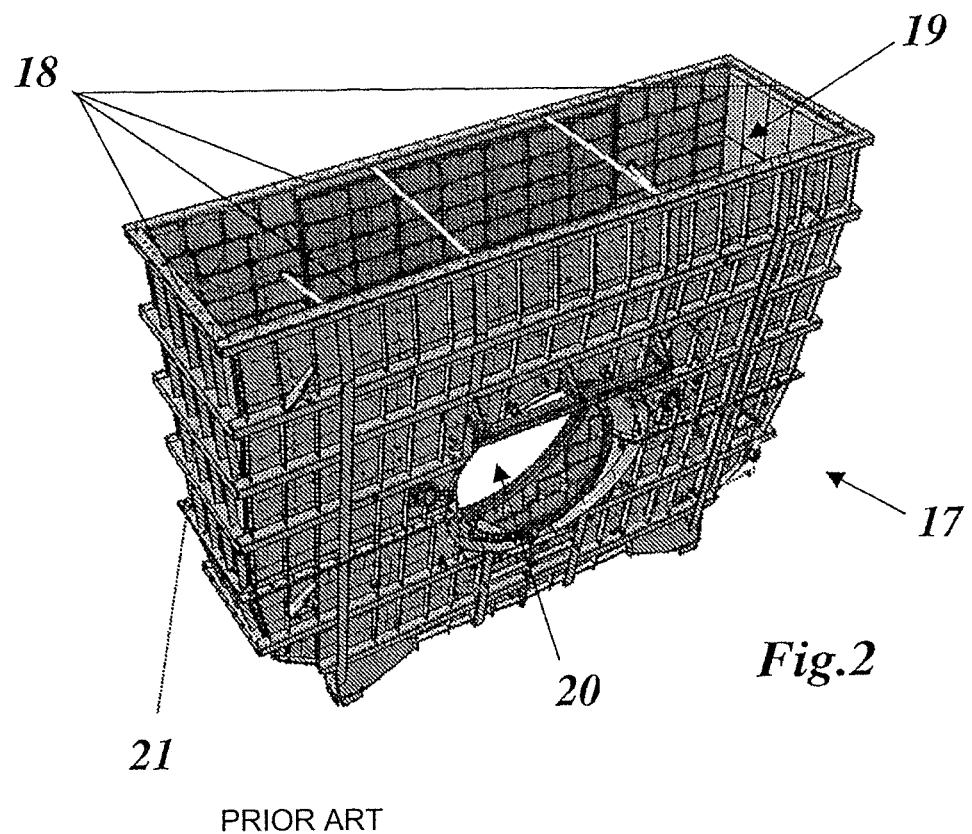
FIG. 2 shows a perspective view of a prior art air intake manifold for the turbine of FIG. 1.
Figure 3:
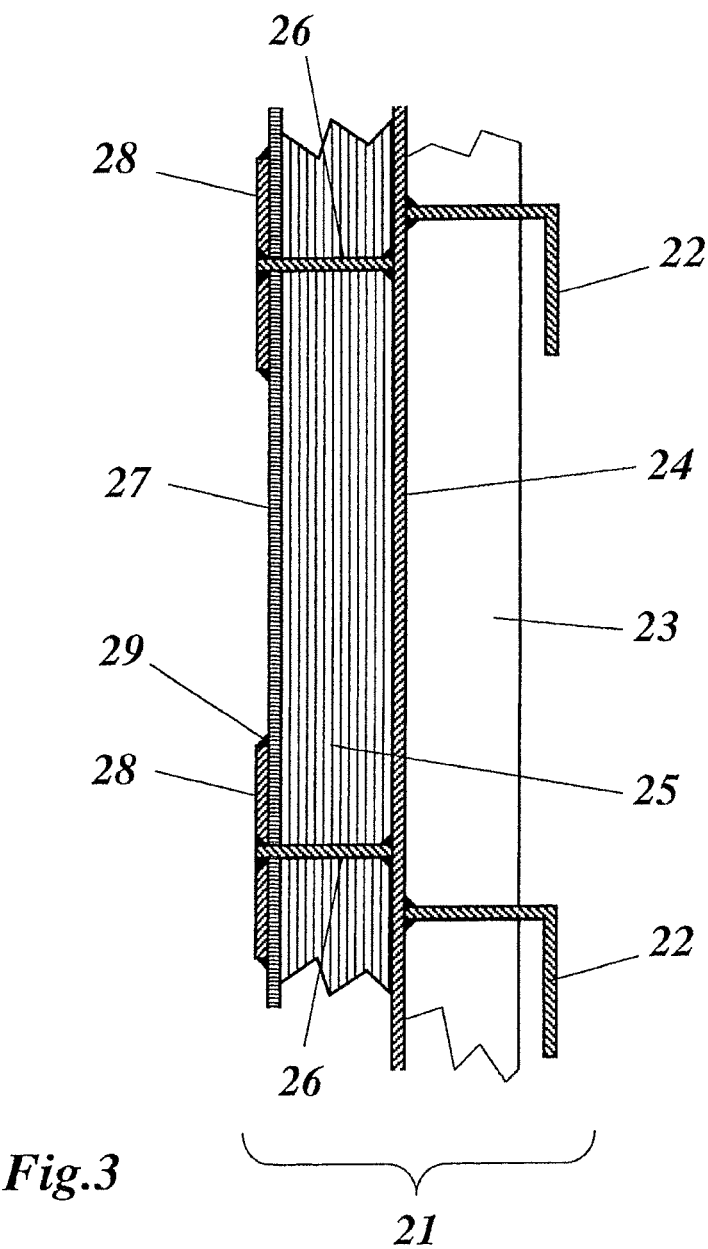
FIG. 3 shows a cross-section of the wall structure of the air intake manifold of FIG. 2.

It is therefore an object of the present invention to provide a wall structure, especially for an air intake manifold of a gas turbine, which avoids the disadvantages of the prior art wall structures, is easily assembled from a substantially reduced number of parts, and has a simplified structure without sacrificing mechanical integrity and stiffness.

This and other objects are obtained by the wall structure according to the appended claims.

The wall structure of the invention comprises first means for mechanically supporting an outer sheet, which separates the spaces on both sides of the wall, e.g. the surroundings and the air duct of an air intake manifold, in an airtight manner, and further comprises second means for establishing noise damping insulation between the spaces on both sides of the wall, whereby said second means is secured to said first means, and said second means is integrated in said first means.

According to an embodiment of the invention the first means comprises a plurality of I-beams, which are arranged in a common plane with their webs oriented perpendicular to said common plane, the outer sheet is secured to a first one of the flanges of the I-beams, and said second means comprises the space between the I-beams being filled with a noise damping insulation material.

According to another embodiment of the invention the noise damping insulation material is enclosed between said outer sheet and perforated sheets, which are secured to a second one of the flanges of the I-beams.

According to a further embodiment of the invention the I-beams and the outer sheet are made of a carbon steel, and the perforated sheets are made of stainless steel.

In another embodiment, intermediate strips of stainless steel are provided between the perforated sheets and the second one of the flanges (31b) of the I-beams.

In a further embodiment, the supporting structure with the I-beams is reinforced by providing intermediate beams between the I-beams, which intermediate beams support said perforated sheets.

Preferably, the intermediate beams are L-beams, and strips of stainless steel are provided between the perforated sheets and the L-beams.

According to another embodiment of the invention the perforated sheets are welded on the I-beams or intermediate strips, respectively, and the perforated sheets are provided with cut-outs being used for said welding.

Especially, the perforated sheets are free of holes in a border area around said cut-outs. They can also be free of holes on their outer borders.

According to another embodiment of the invention the noise damping insulation material is a foam, especially on the basis of a melamine resin.

In a further embodiment of the invention, the I-beams are of a standard IPB 100 type.

In another embodiment of the invention, the outer sheet has a thickness of 4 mm, the I-beams are corrosion protected, and the perforated sheets have a thickness of the 3 mm.

The invention further provides a gas turbine comprising a compressor, which is supplied with air by means of an air intake manifold where the walls of the air intake manifold have a wall structure according to the invention.

DETAILED DESCRIPTION

The invention proposes to measures, namely the integration of the noise damping insulation in the wall structure (without insulation ribs), and the waiving of several small parts welded in the flow channel.

Figure 4:
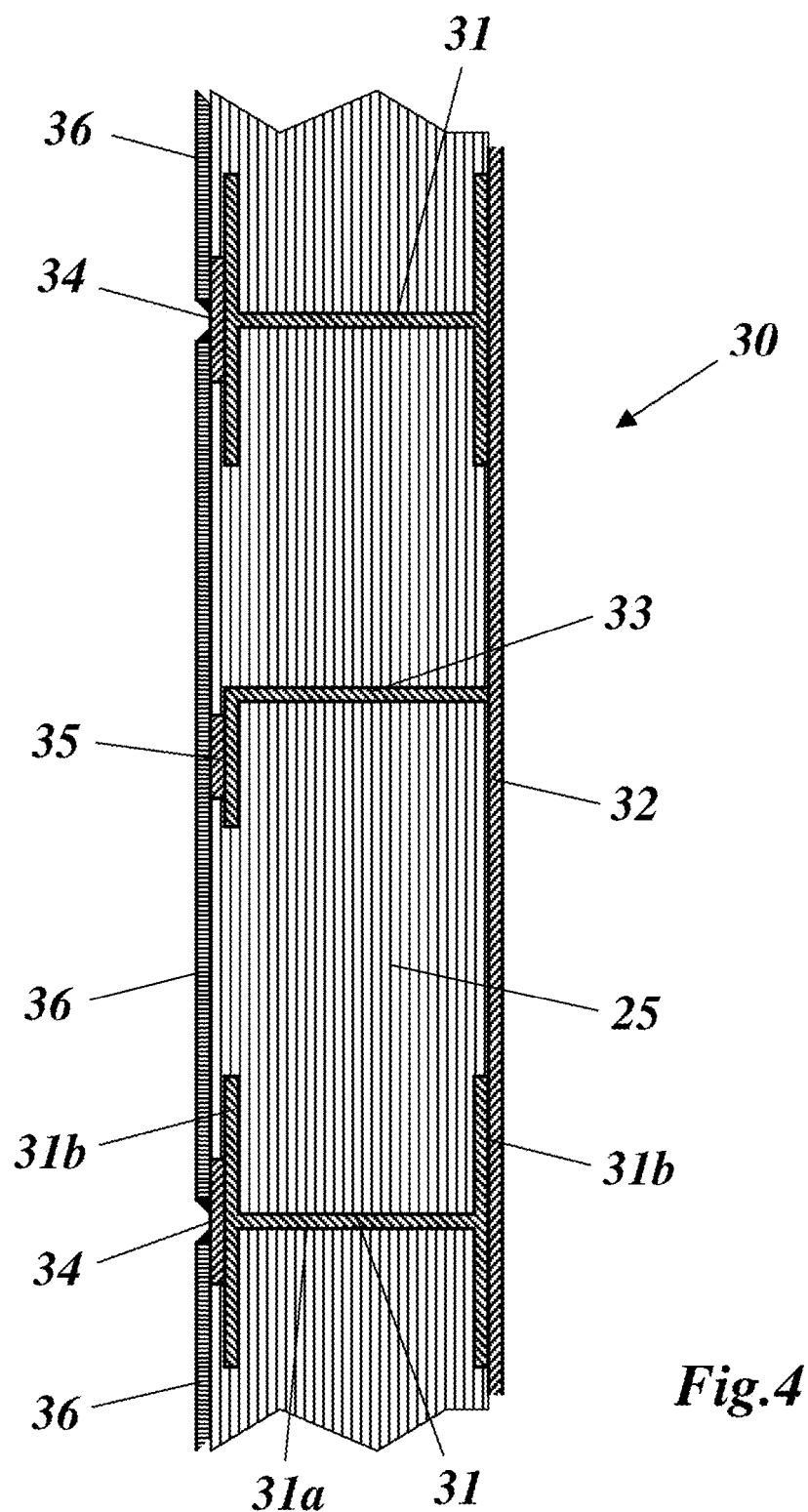
FIG. 4 shows a cross-section of the wall structure of an air intake manifold according to an embodiment of the invention.
Figure 5:
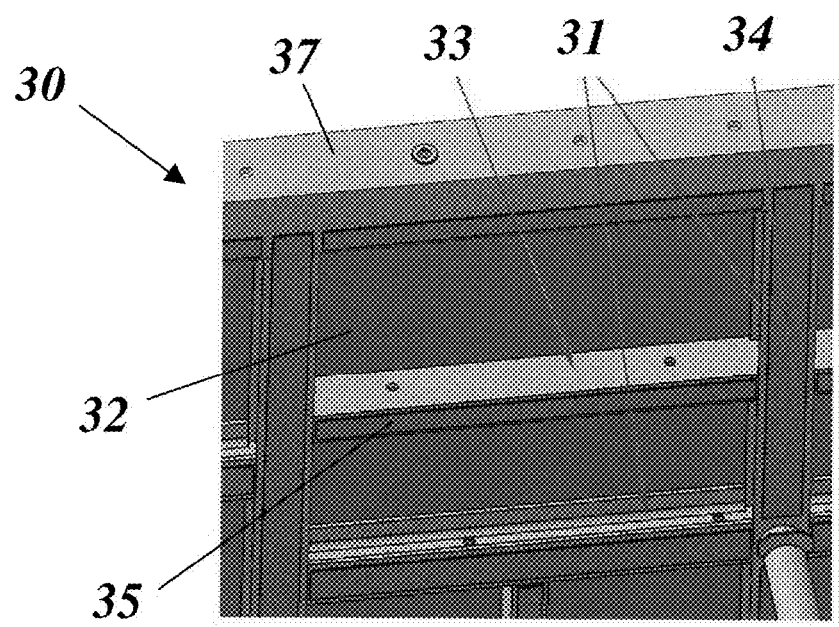
FIG. 5 shows a front view from the interior on the wall of a partially assembled air intake manifold (without melamine foam and perforated plates) according to an embodiment of the invention.

According to FIGS. 4 and 5 the new wall structure 30 is composed of I-beams 31 (e.g. of the IPB 100 type), which are used as main structural elements. The I-beams 31, which are arranged in a common plane with their webs 31a oriented perpendicular to said common plane, support (with their inner flanges 31b) perforated sheets 36 on the inside of the structure. To increase stiffness and fulfill structural resonance criteria, the frame 37 with its I-beams 31 is reinforced with additional L-beams 33. The L beams 33 also serve to support said perforated sheets 36, can support the insulation against movement and, if required can support the outer sheet 32.

The outer sides or outer flanges 31b of the I-beams 31 are covered with a 4 mm thick outer sheet 32 of carbon steel to ensure air tightness. Stainless steel intermediate strips 34 and 35 are welded on the inner sides or flanges 31b of the I-beams 31 (i.e. in the flow channel) and L-beams 33. After a corrosion protection is applied to the structures (37) without perforated plates (36) and without melamine foam (25), the space between the I-beams 31 and L-beams 33 is filled with 105 mm thick melamine foam as noise damping insulation material 25. The melamine foam is then covered with 3 mm thick stainless steel perforated sheets 36 (see FIG. 6). The perforated sheets 36 are welded on the stainless steel intermediate strips 34 and 35.

The provision of the stainless steel intermediate strips 34, 35 allows the application of cheap mild steel for the I-beams 31 (and L-beams 33). The stainless steel perforated sheets 36 are then welded to the stainless steel intermediate strips 34 and 35. In the example of FIG. 4 cut-outs are only indicated for welding the I-beams 35. Similar cut outs can also be provided for welding the L-beams 33.

The I-beams 31 of the invention have the advantage that they are stiff during welding. This is not the case for the insulation ribs 26 of the prior art, when the perforated sheets 27 and fixation plates 28 are welded to them.

Figure 6:
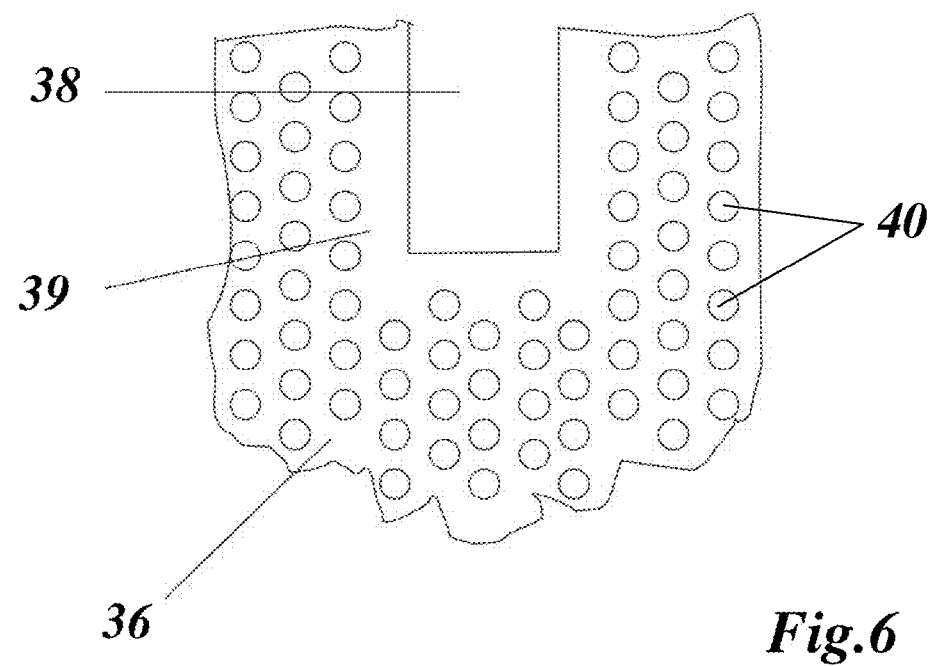
FIG. 6 shows a section of the perforated sheet used in a wall structure according to FIG. 4.

The perforated sheets 36 are preferably made from a large sheet, as shown in FIG. 6. For welding purposes cut-outs 38 are provided. The perforated sheets 36 are preferably free of holes 40 in a border area 39 around said cut-outs 38 so that the cut-outs 38 have straight borders being advantageous for the welding process. The perforated sheets 36 are preferably also free of holes 40 in for the outer border area of the perforated sheets 36.

The melamine foam 25 is flexible and can be introduced between the I-beams 31 and L-Beams 33 without problems.

LIST OF REFERENCE NUMERALS 10 gas turbine
11 air intake
12 compressor
13, 15 combustor
14, 16 turbine
17 air intake manifold
18 wall
19 inlet opening
20 outlet opening
21, 30 wall structure
22, 33 L-beam
23 rib
24, 32 outer sheet
25 noise damping insulation material (e.g. melamine foam)
26 insulation rib (stainless steel)
27, 36 perforated sheet (stainless steel)
28 fixation plate
29 welding
31 I-beam
31a web
31b flange
34, 35 intermediate strip (stainless steel)
37 frame
38 cut-out
39 border area
40 hole

What is claimed is:
1. A wall structure with noise damping insulation properties for an air intake manifold of a gas turbine, comprising:

a first structure that mechanically supports an outer sheet, which separates spaces on both sides of the wall in an airtight manner; and a second structure that establishes noise damping insulation between the spaces on both sides of the wall, the second structure is secured to the first structure, and the second structure is integrated in the first structure;

wherein the first structure comprises a plurality of I-beams, each having first and second flanges and a web therebetween, the plurality of I-beams are arranged in a common plane with the webs oriented perpendicular to the common plane, the outer sheet is secured to the first flange of the I-beams, and the second structure comprises a space between the I-beams being filled with a noise damping insulation material, and the noise damping insulation material is enclosed between the outer sheet and perforated sheets, which are secured to the second flange of the I-beams, the I-beams and the outer sheet are made of a carbon steel, and the perforated sheets are made of stainless steel, and intermediate strips of stainless steel are provided between the perforated sheets and the second flanges of the I-beams.

2. The wall structure according to claim 1, wherein the supporting structure with the I-beams is reinforced by providing intermediate beams between the I-beams, the intermediate beams support the perforated sheets, and/or the outer sheet.

3. The wall structure according to claim 2, wherein the intermediate beams are L-beams, and strips of stainless steel are provided between the perforated sheets and the L-beams.

4. The wall structure according to claim 1, wherein the perforated sheets are welded on the I-beams or the intermediate strips and the perforated sheets are provided with cut-outs being used for the welding.

5. The wall structure according to claim 4, wherein the perforated sheets are free of holes in a border area around the cut-outs.

6. The wall structure according to claim 1, wherein the noise damping insulation material is a foam.

7. The wall structure according to claim 1, wherein the noise damping insulation material is a melamine resin based foam.

8. The wall structure according to claim 1, wherein the I-beams are of a standard IPB 100 type.

9. The wall structure according to claim 1, wherein the outer sheet has a thickness of 4 mm, the I-beams are corrosion protected, and the perforated sheets have a thickness of the 3 mm.

10. A gas turbine including a compressor, which is supplied with air by means of an air intake manifold, wherein walls of the air intake manifold have a wall structure with noise damping insulation properties for an air intake manifold of a gas turbine, the wall structure comprising:

a first structure that mechanically supports an outer sheet, which separates spaces on both sides of the wall in an airtight manner; and a second structure that establishes noise damping insulation between the spaces on both sides of the wall, the second structure is secured to the first structure, and the second structure is integrated in the first structure;

wherein the first structure comprises a plurality of I-beams, each having first and second flanges and a web therebetween, the plurality of I-beams are arranged in a common plane with the webs oriented perpendicular to the common plane, the outer sheet is secured to the first flange of the I-beams, and the second structure comprises a space between the I-beams being filled with a noise damping insulation material, wherein the noise damping insulation material is enclosed between the outer sheet and perforated sheets, which are secured to the second flange of the I-beams, the I-beams and the outer sheet are made of a carbon steel, and the perforated sheets are made of stainless steel, and intermediate strips of stainless steel are provided between the perforated sheets and the second flanges of the I-beams.

11. The gas turbine according to claim 10, wherein the supporting structure with the I-beams is reinforced by providing intermediate beams between the 1-beams, the intermediate beams support the perforated sheets, and/or the outer sheet.

12. The gas turbine according to claim 11, wherein the intermediate beams are L-beams, and strips of stainless steel are provided between the perforated sheets and the L-beams.

13. The gas turbine according to claim 10, wherein the perforated sheets are welded on the I-beams or the intermediate strips and the perforated sheets are provided with cut-outs being used for the welding.

14. The gas turbine according to claim 13, wherein the perforated sheets are free of holes in a border area around the cut-outs.

15. The gas turbine according to claim 10, wherein the noise damping insulation material is a foam.

16. The gas turbine according to claim 10, wherein the noise damping insulation material is a melamine resin based foam.

17. The gas turbine according to claim 10, wherein the I-beams are of a standard IPB 100 type.

* * * * *